United States Patent
Bartoli et al.

(10) Patent No.: US 9,567,155 B2
(45) Date of Patent: Feb. 14, 2017

(54) CAPSULE FOR BEVERAGE

(71) Applicant: SARONG SOCIETA' PER AZIONI, Reggiolo (IT)

(72) Inventors: Andrea Bartoli, Reggio Emilia (IT); Davide Capitini, Reggio Emilia (IT)

(73) Assignee: Sarong Societa' per Azioni (IT)

( * ) Notice: Subject to any disclaimer, the term of this patent is extended or adjusted under 35 U.S.C. 154(b) by 0 days.

(21) Appl. No.: 14/382,663

(22) PCT Filed: Mar. 6, 2013

(86) PCT No.: PCT/IB2013/051789
§ 371 (c)(1),
(2) Date: Sep. 3, 2014

(87) PCT Pub. No.: WO2013/132450
PCT Pub. Date: Sep. 12, 2013

(65) Prior Publication Data
US 2015/0072052 A1    Mar. 12, 2015

(30) Foreign Application Priority Data
Mar. 7, 2012  (IT) .............................. MO2012A0056

(51) Int. Cl.
B65D 85/804    (2006.01)
A47J 31/36    (2006.01)

(52) U.S. Cl.
CPC ........ B65D 85/8043 (2013.01); A47J 31/3633 (2013.01)

(58) Field of Classification Search
CPC .... B65D 85/8043; B65D 85/804; A47J 31/54; A47J 31/44; A47J 31/42; A47J 31/24; A47J 31/10; A47J 31/06; A47J 31/0657; A47J 31/18; A47J 31/3633; A23L 2/00; A47G 19/14
(Continued)

(56) References Cited

U.S. PATENT DOCUMENTS

2010/0196545 A1*  8/2010  Buffet et al. .................... 426/79
2011/0045144 A1*  2/2011  Boussemart et al. ........... 426/80
(Continued)

FOREIGN PATENT DOCUMENTS

DE    102010030988 A1    1/2012
EP    2292552 A1    3/2011
(Continued)

Primary Examiner — Michele L Jacobson
Assistant Examiner — Ericson M Lachica
(74) Attorney, Agent, or Firm — Laubscher, Spendlove & Laubscher, P.C.

(57) ABSTRACT

A capsule includes a deformable and/or compressible casing that is provided with a base wall and with a side wall that define a cavity containing an initial product to be combined with a fluid to obtain a final product and with a nozzle provided with a plurality of openings for the passage of the fluid. The nozzle engages an outflow portion of the base wall and is arranged for exiting from the cavity through the outflow portion when the casing is compressed and/or crushed. The nozzle includes a first portion abutting on and sliding with interference inside the outflow portion in a sealed manner so that the final product exits the cavity at least initially only through at least one further opening of the nozzle.

12 Claims, 8 Drawing Sheets

(58) Field of Classification Search
USPC ............... 426/77, 78, 79, 80, 81, 82, 83, 84; 239/552, 550, 548; 99/295
See application file for complete search history.

(56) References Cited

U.S. PATENT DOCUMENTS

| | | | |
|---|---|---|---|
| 2011/0110180 A1* | 5/2011 | Snider .................... | A47J 31/407 366/142 |
| 2011/0151060 A1* | 6/2011 | Nakagiri ............. | A47J 31/0642 426/77 |
| 2013/0105340 A1* | 5/2013 | Hother et al. ................ | 206/222 |

FOREIGN PATENT DOCUMENTS

| | | |
|---|---|---|
| WO | 2008132571 A1 | 11/2008 |
| WO | 2009133134 A1 | 11/2009 |
| WO | 2011035942 A1 | 3/2011 |
| WO | 2011117768 A1 | 9/2011 |

\* cited by examiner

CAPSULE FOR BEVERAGE

This application is a national phase of PCT International Application No. PCT/IB2013/051789 filed Mar. 6, 2013. PCT/IB2013/051789 claims priority to IT Application No. MO2012A000056 filed Mar. 7, 2012. The entire contents of these applications are incorporated herein by reference.

BACKGROUND OF THE INVENTION

The invention relates to capsules or containers for preparing beverages in automatic dispensing machines, in particular it relates to a sealed single-dose and disposable capsule containing an initial percolatable or soluble or infusion or freeze-dried or dehydrated or concentrated product that is able to make a foodstuff final product, for example a beverage by interacting with pressurised fluid, typically water or milk.

BRIEF DESCRIPTION OF THE PRIOR ART

Known capsules for use in known dispensing machines are disposable and single-dose containers including an outer casing made of synthetic plastic material that is impermeable to liquids or gases and are shaped like a glass or cup. In particular, the casing has a bottom wall and a side wall that define an upper opening through which the product used to create a beverage can be inserted. The upper opening is closed hermetically by a cover, typically a film of aluminium or plastics, in such a manner as to seal the product inside the container. The capsule is perforable to enable pressurised liquid, typically water, to be delivered, and to enable the beverage to exit. In particular, the cover and the bottom wall of the casing are perforable by a suitable device of a dispensing machine in which the capsule can be inserted to enable the pressurised fluid to be delivered from above and the beverage to be extracted from below.

One drawback of the known capsules disclosed above lies in the fact that they can be used only on dispensing machines provided with a suitable dispensing device including an extracting device suitable for perforating the bottom of the capsule to enable the beverage to exit and a conduit that is suitable for conveying the beverage to the consumption container (for example a mug, a cup, a glass, etc.). This dispensing device makes the structure of the machine more complex and costly. Further, since it is in contact with the dispensed beverages, it should be properly washed after each dispensing, both for hygienic reasons and in order not to compromise the taste and quality (organoleptic properties) of a subsequently dispensed beverage (for example an herbal tea dispensed after a coffee). Nevertheless, a device for washing the dispensing device is not always present in known machines because of the structural complexity and costs.

Dispensing machines further include a supply circuit provided with an injecting device (typically needles or pointed nozzles) that pierce the cover and deliver the pressurised fluid coming from a pump and/or from a boiler. During the operating step of producing the beverage, the injecting device can come into contact with the product and/or with the beverage and can then get dirty. In addition to the dispensing device, the injecting device of the supply circuit should be suitably washed after each dispensing for hygienic reasons and in order not to compromise the organoleptic properties of a subsequently dispensed beverage.

In order to overcome this drawback, capsules for beverages are provided that are fitted with a first filtering element that closes the upper opening of the outer casing and with a second filtering element inserted on the bottom wall of the outer casing. The filtering elements, which are generally made of plastic material, prevent the product from exiting outside the capsule, but enable the pressurised liquid to pass and the beverage to exit. With this type of capsule, an extracting device is not required in the dispensing machine since the beverage exiting from the capsule can be poured directly into a consumption container. Further, the injecting device does not come into contact with the product or the beverage from which it is separated by the first filtering element.

The aforesaid capsules have the drawback of being costly because they comprise filtering elements integrated into outer casing. Further, due to the aforesaid filtering elements, which act as respective hydraulic resistances to the passage of the liquids, they require very high liquid supply pressure and thus more complex and costly special dispensing machines.

A further drawback of the prior capsules lies in that fact that since they do not hermetically seal the product, due to the filtering elements and for hygienic and product preservation reasons, they have to be suitably packaged, for example in sealed bags, in particular in a controlled atmosphere, with a consequent further increase in production costs.

The known capsules disclosed above enable beverages to be obtained by percolation of the liquid through the product (typically coffee) or by solubilisation of the product (for example, tea, herbal tea, etc.). In this latter case, the product has to be easily and rapidly soluble in such a manner as to avoid the formation of clots or lumps inside the capsule and/or in the consumption container. Due to the speed and manner of dispensing the liquid inside the capsule it is substantially impossible to dissolve properly products that are difficult to dissolve or dissolve slowly and/or products containing thickeners, or freeze-dried or dehydrated products in order to obtain in the consumption container fluid final products such as beverages (typically chocolate) that are dense and full-bodied or viscous.

As is known, such products can be obtained from an initial powder product only manually, by gradually adding the liquid to the latter and mixing the mixture continuously until the final product is obtained.

BRIEF SUMMARY OF THE INVENTION

One object of the present invention is to improve known capsules, in particular sealed, single-dose and disposable capsules containing an initial percolatable or soluble or infusion or freeze-dried or dehydrated or concentrated product suitable for interacting with a fluid, typically hot pressurised water to prepare a corresponding foodstuff final product typically a beverage, in an automatic dispensing machine.

Another object is to obtain a hermetically closed capsule that is able to preserve and isolate in an optimum manner the product contained therein without requiring a special package.

Another object is to obtain a capsule that is able to dispense a foodstuff final product directly into a consumption container (cup, glass, etc.) without any need for perforation by means of the dispensing machine.

Still another object is to make a capsule that enables means or parts of the dispensing machine not to be dirtied or polluted with the initial and/or final product, in this manner ensuring both the hygiene and the cleanliness of the dispensing machine and the taste and quality, i.e. the integrity of the organoleptic properties, of the final product.

Another further object is to make a capsule that enables the final product prepared in the consumption container to be dispensed in a controlled and uniform manner, in particular with reduced and limited exiting pressure and speed.

BRIEF DESCRIPTION OF THE FIGURES

The invention can be better understood and implemented with reference to the attached drawings that illustrated some embodiments thereof by way of non-limiting example, in which.

DETAILED DESCRIPTION

With reference to FIGS. 1 to 6, a capsule 1 for beverages according to the invention is illustrated, that is usable in a dispensing machine to produce a foodstuff final product, for example a beverage such as coffee, barley, herbal tea, tea, chocolate, etc, by injecting a pressurised fluid into the capsule. The initial product is percolatable or soluble or infusion or freeze-dried or dehydrated or concentrated foodstuff product.

Figure 1:
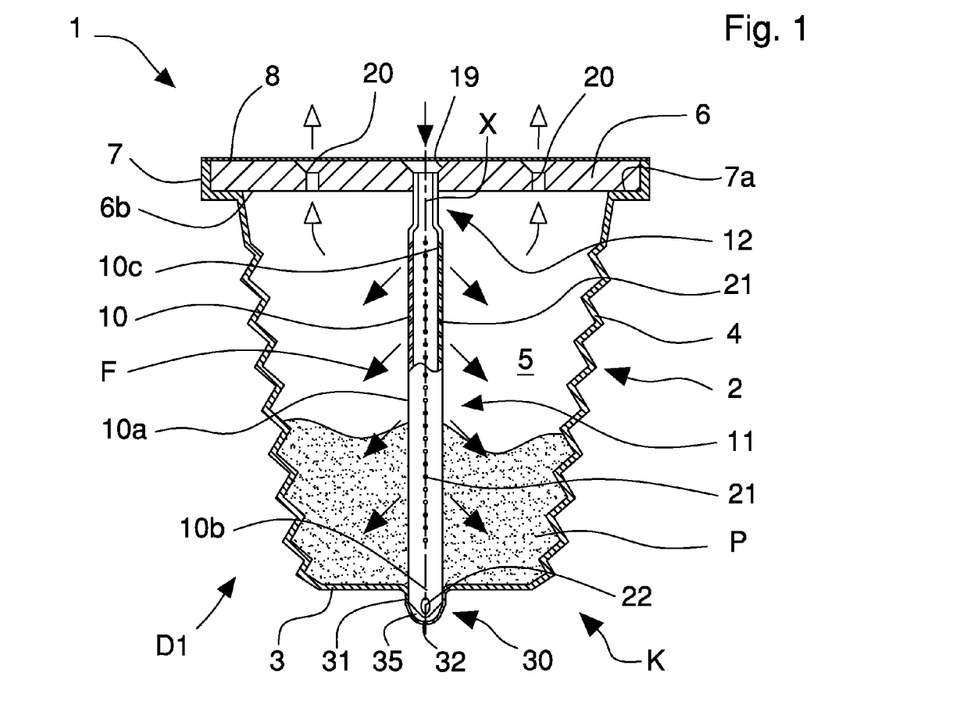
FIG. 1 is a schematic cross section of a capsule according to the invention in a first operating step.

The capsule 1 comprises an external casing 2 or container that is substantially glass or cup-shaped that is provided with a base wall 3 and with a side wall 4 that define a cavity 5 that is open and suitable for containing the initial product P from which to obtain the final product B.

The casing 2 is compressible and/or crushable and/or deformable, is made by forming a sheet of thermoformable material, in particular a multilayered plastic material that is impermeable to liquids and gases and is suitable for contact with foodstuffs.

In order to enable the casing 2 to be compressed and crushed along a direction A that is substantially parallel to a longitudinal axis X of the capsule 1 and is substantially orthogonal to the base wall 3, the side wall 4 is deformable and/or compressible along preset compliance lines, for example having a helical shape or is concertina or bellows-shaped, as in the illustrated embodiment.

Further, the side wall 4 diverges from the base wall 3 up to a peripheral flange-shaped edge 7, for example with an almost frustoconical shape.

The capsule 1 further comprises a supporting element 6 fixed to the edge 7 of the casing 2 and facing the cavity 5 and to which a nozzle 10 is fixed that is arranged for delivering a fluid F into the cavity 5, in particular a hot pressurised liquid, for example water or milk, that is able to interact with the initial product P to make the final product B, in a first operating step D1 preparing the latter.

The edge 7 has an annular seat 7a that receives a peripheral edge of the supporting element 6 that can be fixed there by welding or gluing.

The nozzle 10 of elongated rectilinear shape is provided with a plurality of openings 21, 22 that enable the fluid F to pass, in particular to be dispensed into the cavity 5 in the first operating step D1. The nozzle 10 is engaged in an outflow portion 30 of the base wall 3 and arranged for exiting from said cavity 5 through the outflow portion 30 when the casing 2 is compressed and crushed, in a second operating step D2. In particular, the nozzle 10 is configured and shaped in such a manner as to pierce the aforesaid outflow portion 30 and exit from the cavity 5.

The nozzle 10 comprises a stiff, for example cylindrical, tubular element having a respective side wall 10a provided with a plurality of openings 21 and a sharpened end 10b that is able to pierce the outflow portion 30.

In an initial configuration K of the capsule 1, in which the casing 2 is not compressed or crushed, the nozzle 10 is arranged completely inside the cavity 5 and parallel to the longitudinal axis X of the capsule 1, for example substantially coaxial with the latter, with the end 10b inserted into the outflow portion 30.

Figure 5:
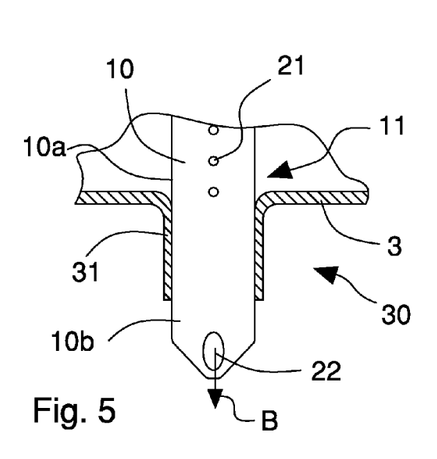
FIG. 5 illustrates an enlarged detail of FIG. 3 showing, in particular, a base wall and an end of a nozzle of the capsule.

The nozzle 10 comprises a first portion 11 arranged for abutting on, and sliding in a sealed manner inside the outflow portion 30, such that the final product B exits from the cavity 5 only through the nozzle 10 when the casing 2 is compressed and/or crushed. For this purpose, the outflow portion 30 comprises an annular wall 31 arranged for abutting in a sealed manner on a respective side wall 10a of the nozzle 10. The cross sections of the nozzle 10, at the first portion 11, and at the annular wall 31 have a complementary shape. In order to ensure the seal, the nozzle 10 is inserted into and slides with interference inside the annular wall 31.

In the illustrated embodiment, the annular wall 31 projects externally in relation to the cavity 5. Alternatively, the annular wall 31 and the entire outflow portion 30 can extend inside the cavity 5.

The outflow portion 30 further comprises a bottom wall 32 connected to the annular wall 31, in such a manner as to form a space 35 that is suitable for partially housing the end 10b of the nozzle 10. The bottom wall 32 is easily breakable by the end 10b of the nozzle 10 when the casing 2 is compressed and crushed. For this purpose, the bottom wall 32 is made with a reduced wall thickness.

Alternatively, the bottom wall 32 can comprise a precutting line or a weakening portion that facilitates perforating by the nozzle 10.

The end 10b of the nozzle 10 is provided with at least one further opening 22 arranged for dispensing the fluid F inside the cavity 5 during the first operating step D1 when the casing 2 is in the initial configuration K, i.e. is not compressed or crushed, or for dispensing the fluid F and/or the final product B directly into a consumption container 100 when said casing 2 is compressed and crushed, in the subsequent second operating step D2, as explained better below in the description.

The openings 21 are distributed along the side wall 10a of the nozzle 10 in such a manner that in the first operating step D1, when the casing 2 is in the initial configuration K, they dispense the fluid F into the cavity 5; in the subsequent second operating step D2, as explained further on in the description, when the casing 2 is compressed and crushed and the nozzle 10 progressively exits from the cavity 5, the openings 21 situated inside the latter receive and/or suck the final product B and/or a mixture of said initial product P and said fluid F, whilst the openings 21 situated outside the cavity 5 dispense the final product B and/or the fluid F into the consumption container 100.

The openings 21 are spaced angularly apart from one another and linearly along the side wall 10a of the nozzle 10 and are tilted towards the base wall 3, for example by an angle of 45° with respect to the longitudinal axis X. In this manner the openings 21 dispense a plurality of fluid jets F towards the base wall 3 or the final product B inside the consumption container 100, when the aforesaid openings 21 are situated respectively inside or outside the cavity 5.

The nozzle 10 further comprises a second portion 12 adjacent to the first portion 11 and spaced away from the base wall 3, in particular interposed between the first portion 11 and the supporting element 6, said second portion 12 being provided with a cross section that is less than that of the first portion 11 and anyway such as to enable the final product B to exit from said cavity 5 through a passage defined by said outflow portion 30 and said second portion 12, when the casing 2 is compressed and crushed so as to bring said second portion 12 to the aforesaid outflow portion 30. In this manner the beverage B contained in the capsule 1 can substantially exit through gravity.

Figure 6:
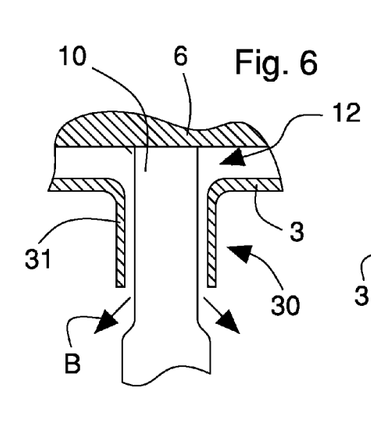
FIG. 6 is an enlarged cross section of the capsule in FIG. 1 in an operating step.

In the embodiment illustrated in FIGS. 1 to 6, the second portion 12 has a substantially circular cross section, like that of the first portion 11, but with a smaller diameter in such a manner as not to abut on the annular wall 31. As illustrated in FIG. 6, the side wall 10a of the nozzle 10 at the second portion 12 and the annular wall 31 of the outflow portion 30 define, or form, the passage through which the final product B can exit.

The shape of the cross section of the second portion 12 can also be oval or polygonal, such as to make with the annular wall 31 of the outflow portion 30 an outlet passage for the final product B.

A cover element 8 is fixed to the first edge 7 and/or to an external surface 6a of the supporting element 6 to hermetically close the capsule 1. The cover element 8, which typically includes a film of aluminium or plastics, is perforable by an injecting device of a dispensing machine that is suitable for receiving the capsule 1 of the invention.

Figure 2:
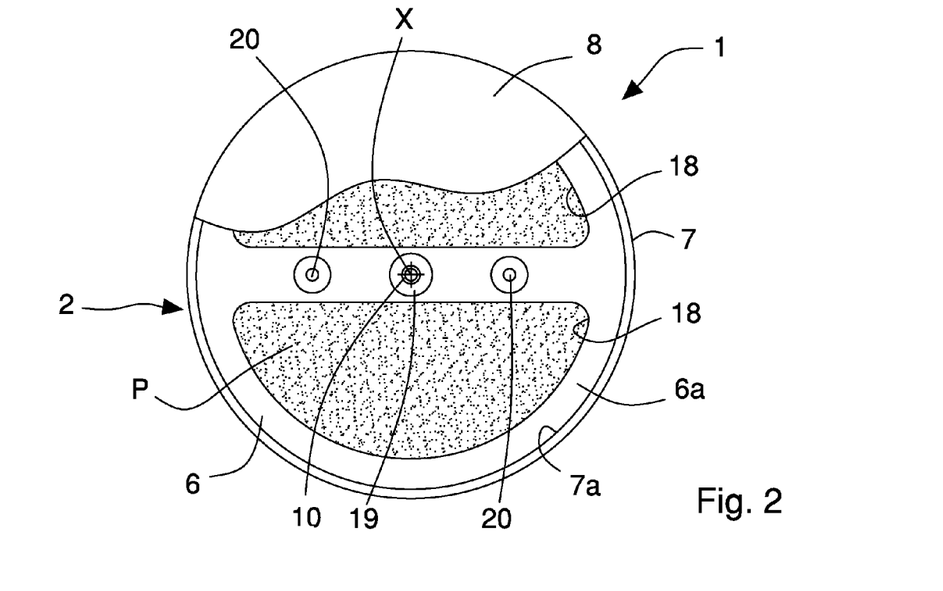
FIG. 2 is a top plan view of the capsule in FIG. 1, with a partially removed cover element to better highlight an underlying supporting element.

The supporting element 6 comprises a body having a substantially flat shape, for example a disc, and which is provided with one or more openings 18, for example two, for introducing the product P into the cavity 5 of the capsule 1, during a filling step of the latter.

The supporting element 6 includes an internal surface 6b that is opposite the external surface 6a and to which the nozzle 10 is fixed. The external surface 6a is provided with a supply hole 19 that is in a flowing connection with an internal conduit 10c of the nozzle 10 and can be engaged by an injecting device of a dispensing machine that is suitable for dispensing the fluid F.

The supporting element 6 further includes at least one vent hole 20 to enable the air or inert gas contained in the capsule 1 to exit when the fluid F is introduced into the cavity 5. Also the vent hole 20 can be engaged by the injecting device of the dispensing machine.

The supporting element 6 and the nozzle 10 can be made of a single body, for example by a process of injection moulding of plastics.

It should be noted that owing to the supporting element 6 provided with supply hole 19 and vent hole 20, the injecting device of the dispensing machine does not come into contact with the initial product P and/or with the mixture/final product B during the preparation step and subsequently during the dispensing step. In other words, a supply circuit of the machine that includes the injecting device is not dirtied or polluted with the initial and/or final product, thus ensuring the hygiene of the dispensing process and the quality of the final products at each dispensing, and preserving the organoleptic properties thereof.

The operation or use of the capsule 1 of the invention in a dispensing machine provides in the first operating step D1 the delivery of the fluid F inside the cavity 5 through the openings 21 of the nozzle 10. The nozzle 10 is supplied by an injecting device of the dispensing machine that is able to perforate the cover element 8 and engage the supply hole 19.

In this step the inert air and/or gas in the cavity 5 can exit through the vent hole 20, which is also opened by the injecting device of the dispensing machine.

The fluid F introduced by a plurality of jets through the openings 21 can interact with the initial product P to form the final product B, typically a beverage, slowly. In this step, the casing 2 of the capsule 1 is in the initial configuration K, i.e. it is not compressed or crushed and the end 10b of the nozzle is engaged, inserted in a sealed manner in the outflow portion 30, which is whole.

Figure 3:
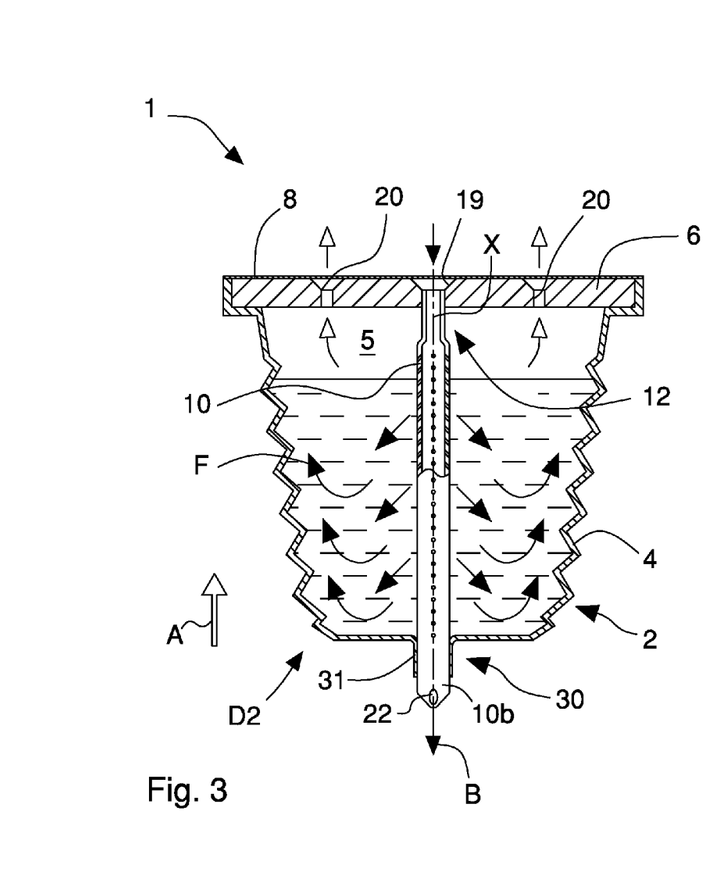
FIGS. 3 and 4 are cross sections of the capsule in FIG. 1 in subsequent operating dispensing steps.

Once the final product B has been obtained, after a preset time and/or a preset quantity of delivered fluid F, in the second operating step D2 the cavity 5 is isolated by closing the vent hole 20 and the casing 2 is progressively compressed and crushed along the direction A so as to enable the nozzle 10 to pierce the outflow portion 30 and in particular the bottom wall 32 and exit from the cavity 5.

As the first portion 11 of the nozzle 10 abuts on and slides in a sealed manner inside the annular wall 31 of the outflow portion 30, the final product B can exit from the cavity 5 initially only through the further opening 22 and subsequently, when the nozzle extends progressively to the outside of the capsule 1 through the openings 21 that become external to the cavity 5.

As the cavity 5 is closed (the vent hole 20 is closed), by crushing and compressing the casing 2 the final product B contained therein is forced to exit by the pressure through the openings 21 located inside the cavity 5.

By continuing the compressing and crushing of the casing 2, the second portion 12 of the nozzle 10 is inserted into the outflow portion 30 thus opening a passage for the complete exit of the final product B from the capsule 1 (FIG. 6).

If the volume of the cavity 5 corresponds to the final volume to be dispensed into the consumption container, further fluid F is not supplied to the nozzle by the injecting device of the dispensing machine during the second operating step D2.

Figure 4:
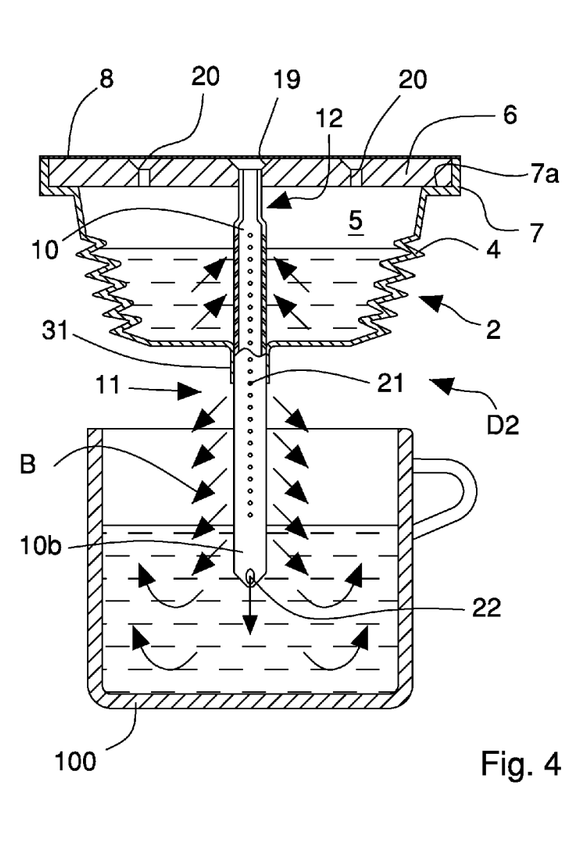

If, on the other hand, the volume of the capsule 1 is less than that of the final volume to be dispensed into the consumption container, during the second operating step D2, the nozzle 10 is supplied with further fluid F by the injecting device. The latter is dispensed directly into the consumption container 100 to dilute final product B to the desired concentration.

It is as well to observe that with initial percolation or infusion products (such as, for example, tea, or herbal teas or infusions) the nozzle 10 acts substantially as a filter as the openings 21 in the second operating dispensing step D2, as disclosed above, retain and lock inside the cavity 5 non soluble particles and bodies (for example tea leaves or coffee grounds) of the initial product P, whereas they enable the final product B thereby obtained to exit.

The nozzle 10 further enables initial products that are hardly or slowly soluble and/or containing thickening agents and/or stabilisers or freeze-dried or dehydrated products to be solubilised and dissolved completely without the manual intervention of a user so as to obtain dense or viscous final products (for example chocolate) that are perfectly dissolved and devoid of clots and lumps. During the dispensing step (second operating step D2), when the casing 2 is compressed and crushed, the mixture of initial product P and of fluid F is in fact forced to traverse the openings 21 of the nozzle 10, and in this manner it is mixed, solubilised and dissolved.

The dimensions, shape, tilt, number and arrangement of the openings 21 on the nozzle 10 can be suitably selected according to the type and composition of the initial product P. The capsule 1 of the invention also has the advantage of dispensing the final product B directly into a consumption container 100 (cup, glass, etc.) without the need to be perforated below. By compressing and crushing the capsule 1, i.e. the casing 2, the nozzle 10 opens the outflow portion 30 of the base wall 3 and enables the final product B to exit in a controlled manner through the further opening 22 and, subsequently, through the openings 21, directly into the consumption container.

The capsule 1 of the invention can thus be used on a dispensing machine devoid of a dispensing device since this capsule does not require an extracting device suitable for piercing the bottom thereof to enable the beverage to exit or a conduit for conveying the beverage to the consumption container (for example a mug, a cup, a glass, etc.).

The absence of the dispensing circuit makes the dispensing machine simpler and cheaper and further ensures the hygiene of the dispensing process and the maintenance of the quality of the dispensed beverages as contamination between subsequently dispensed beverages is impossible.

A further advantage of the capsule 1 is that it does not require a special sealed package as the wall 3 and the outflow portion 30 hermetically isolate the cavity 5 from the external environment so as to preserve the initial product P.

Figure 7:
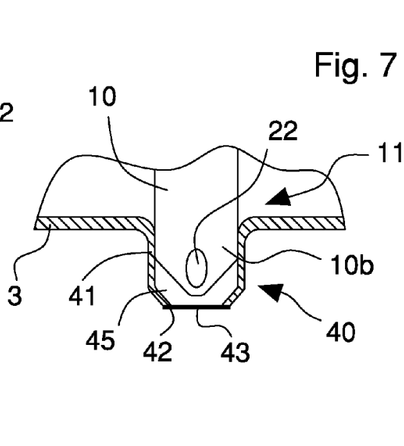
FIG. 7 is an enlarged partial section of a version of the capsule of the invention.

The FIG. 7 illustrates one version of the capsule 1 of the invention that differs from the previously disclosed embodiment, through the fact of comprising an outflow portion 40 provided with an outlet hole 42, hermetically closed by a closing element 43 that is fixed externally to the peripheral wall 41 of the aforesaid outflow portion 40 and forms with said peripheral wall the space 45 that is suitable for partially housing the end 10b of the nozzle 10. The closing element 43 is, for example a film of plastics or aluminium that is perforable or at least partially detachable from the end 10a when the casing 2 is compressed and crushed.

Figure 8:
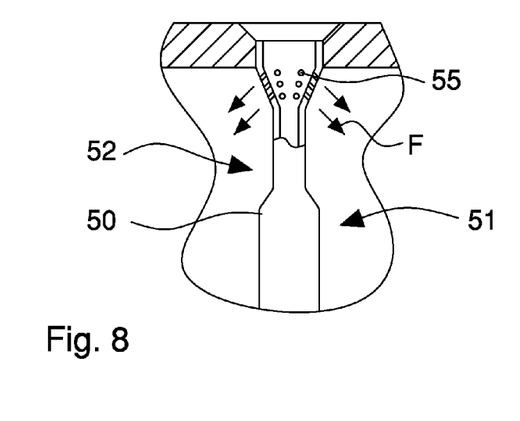
FIGS. 8 and 9 are enlarged and partial sections of respective further versions of the capsule of the invention.

With reference to FIG. 8, another version of the capsule 1 of the invention is provided that differs from the previously disclosed embodiment through the fact of comprising a different nozzle 50. The latter comprises a first portion 51 devoid of an opening on the side wall and a second portion 52 with a variable section that is on the other hand provided with a plurality of openings 55. In particular, the second portion 52 comprises a first part, adjacent to the first portion 51, with a reduced section to enable the final product B to exit through the outflow portion 30 (when the casing is substantially completely compressed and crushed) and a second part, adjacent to the supporting element 6, the second part having a divergent section and being provided with openings 55. The end of the nozzle 50 has one or more further openings.

In the first operating step D1 the initial product P on the bottom of the capsule is sprinkled from above by the fluid F delivered through the openings 55.

In the second operating step D2, the compressing and crushing of the casing 2 push the final product B to enter through the openings 55 in the nozzle 50 to exit from the end in the consumption container 100.

Figure 9:
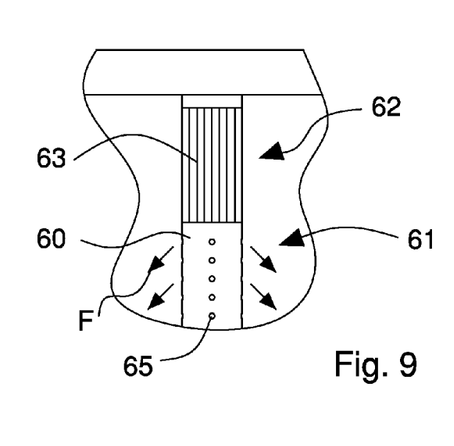

FIG. 9 illustrates a further version of the capsule 1 of the invention that is distinguished from the embodiment in FIG. 1 by the nozzle 60 that comprises a second portion 62, comprised between the first portion 61 provided with openings 65 and the supporting element 6, provided with a plurality of grooves 63, for example longitudinal, that form with the annular wall 31 of the outflow portion 30 the outlet passage for the final product B.

Figure 10:
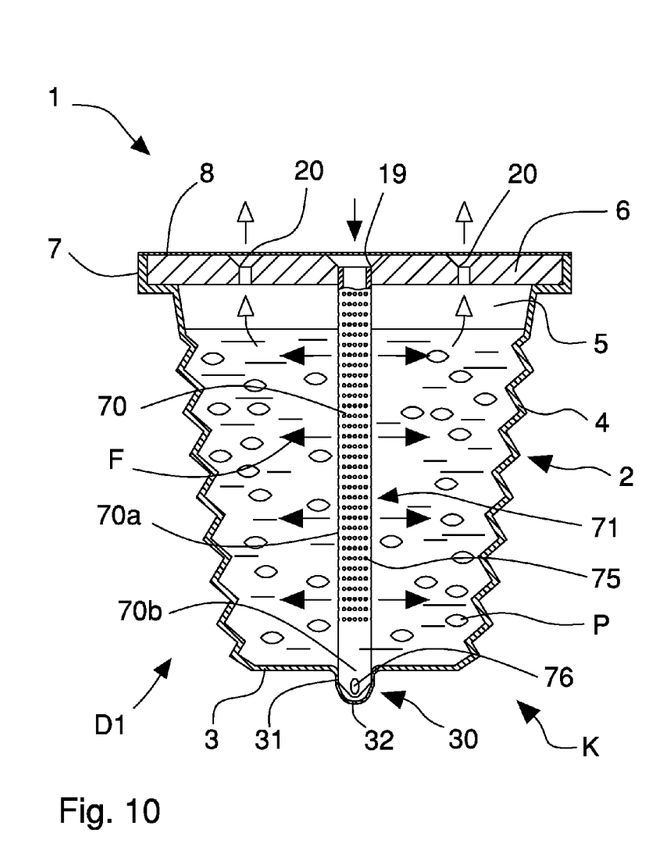
FIG. 10 is a schematic cross section of another version of the capsule of the invention in a first operating step.
Figure 11:
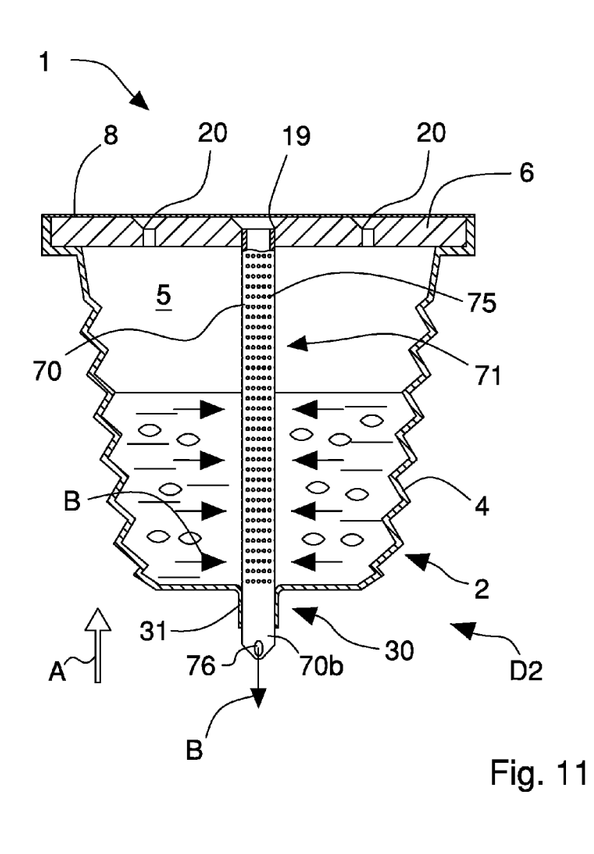
FIG. 11 is a schematic cross section of the capsule in FIG. 10 in a second operating step.

With reference to FIGS. 10 and 11, another further version of the capsule 1 of the invention is provided that is distinguished from the previously disclosed embodiments by the different nozzle 70. The latter comprises a first portion 71 that extends from the end 70b to the supporting element 6, i.e. it is devoid of a second portion with a reduced section. The first portion 11 is provided along its entire length of a plurality of openings 75 made on the side wall 70a that are angularly and linearly spaced apart from one another.

In the first operating step D1 the initial product P located in the cavity 5 is sprinkled by the fluid F delivered through the openings 75. After an infusion step, in the second operating step D2, the casing 2 is partially compressed and crushed in such a manner that the nozzle 70 can open the outflow portion 30. The vent hole 20 is maintained open to enable the air to exit from the cavity 5. In this manner the final product B can exit by gravity through the openings 75 and the further opening 76 provided on the end 70b of the nozzle. Dispensing does not in this case require the casing to be completely crushed. This capsule version is particularly suitable for producing beverages from initial infusion products.

FIGS. 12 to 15 illustrate still another version of the capsule 1 of the invention that is distinguished from the previously disclosed embodiments by the different conformation of the nozzle 80 and of the outflow portion 90 of the base wall 3.

The nozzle 80 is substantially similar to the nozzle of the capsule 1 illustrated in FIGS. 1 to 4, differing by the different end 80b having a substantially flared shape. More precisely, the end 80b has a further opening 82 for dispensing the fluid F having a section that is equal to the internal cross section of the nozzle and an edge or external flange 80d that peripherally surrounds the further opening 82.

Figure 12:
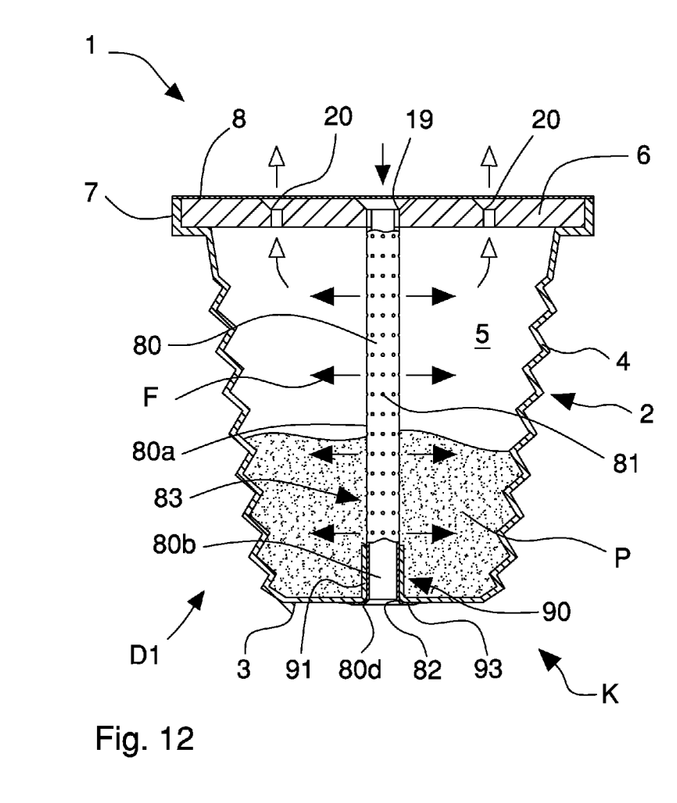
FIG. 12 is a schematic cross section of another further version of the capsule of the invention in a first operating step.
Figure 13:
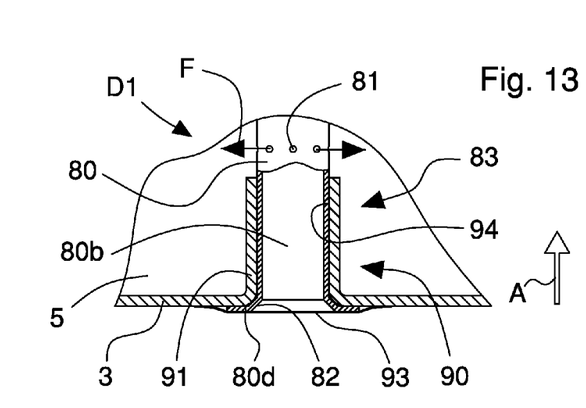
FIG. 13 illustrates an enlarged detail of FIG. 12 showing, in particular, a base wall and an end of a nozzle of the capsule.

The outflow portion 90 is open, i.e. it has an outlet hole 94 that is nevertheless closed in a sealed manner by the nozzle 80. The outflow portion 90 in fact comprises an annular wall 91 that extends, for example, inside the cavity 5 and forms the outlet hole 94. The annular wall 91 is intended to engage in a sealed manner the respective side wall 80a of the nozzle 80, at the first portion 83 of the latter. The cross sections of the nozzle 80, at the first portion 83, and of the annular wall 91, have complementary shapes. In order to ensure the seal, the nozzle 80 is inserted into and slides with interference inside the annular wall 91. In an initial configuration K of the capsule 1 and during the first operating step D1, when the casing 2 is in the original shape i.e. is not compressed or crushed, the end 80b of the nozzle 80 is inserted (through the outlet hole 94) and engages in a sealed manner the outflow portion 90. In particular, the side wall 80a abuts in a sealed manner on the annular wall 91, whereas the flange 80d abuts on an external surface of the base wall 3. A further closing element 93 is provided to close hermetically the further opening 82 of the nozzle 80 and preserve and insulate from the external environment the product P contained in the capsule. The further closing element 93 further prevents the fluid F and/or the beverage B from exiting from the capsule 1 during the first operating step D1 when the fluid F is delivered into the cavity 5 through the openings 81 of the nozzle 80 (FIG. 13).

Figure 14:
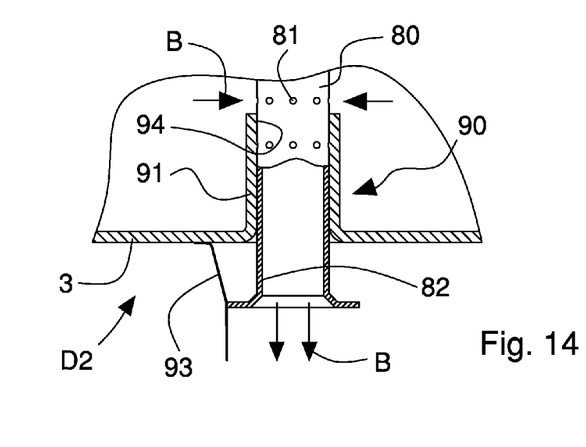
FIG. 14 is an enlarged partial section of the capsule in FIG. 12 in a second operating step.

The further closing element 93 is fixed removably to an external surface of the base wall 3 and can be easily detached by a user before introducing the capsule 1 into the dispensing machine or from the nozzle 80 in the second operating step D2. In this operating step, similarly to what occurs for the previously disclosed capsules, the cavity 5 is insulated by closing the vent hole 20 and the casing 2 is progressively compressed and crushed along the direction A so as to enable the nozzle 80 to detach the further closing element 93 and exit from the cavity 5 to dispense through the further opening 82 the beverage B into the consumption container. In the second operating step D2, the openings 81 situated inside the cavity 5 receive the final product B and/or a mixture of said initial product P and said fluid F, whereas the openings 81 that are outside the cavity 5 dispense the final product B and/or the fluid F in the consumption container.

Alternatively, the further closing element 93 can be removably fixed to the external flange 80d in such a manner as to close hermetically the further opening 82. In this case, the further closing element 93 has to be detached by the user before introducing the capsule 1 into the dispensing machine.

Figure 15:
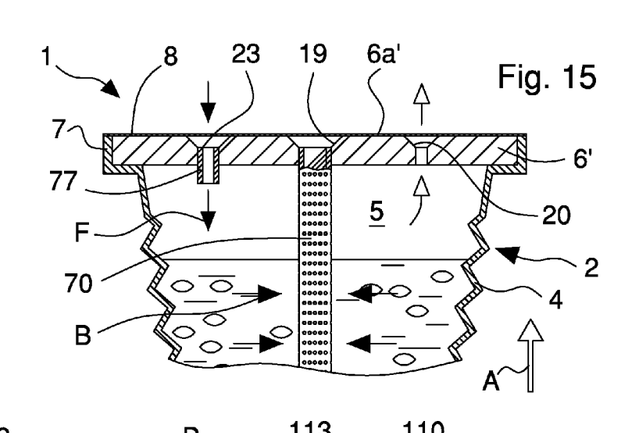
FIG. 15 is a partial section of another version of the capsule of the invention in FIG. 10.

FIG. 15 illustrates one embodiment of the capsule in FIG. 10 including a further nozzle 77 fixed to the supporting element 6'. The latter includes on the external surface 6a' a further supply hole 23 that is flowingly connected to an internal conduit of the further nozzle 77 and can be engaged by the injecting device of the dispensing machine.

The further nozzle 77 can be used in the second operating step D2 to inject the fluid F inside the cavity 5, whilst the nozzle 70 dispense the beverage B into the consumption container.

A further nozzle can also be provided for the capsules of the invention illustrated in FIGS. 1 to 9.

Figure 16:
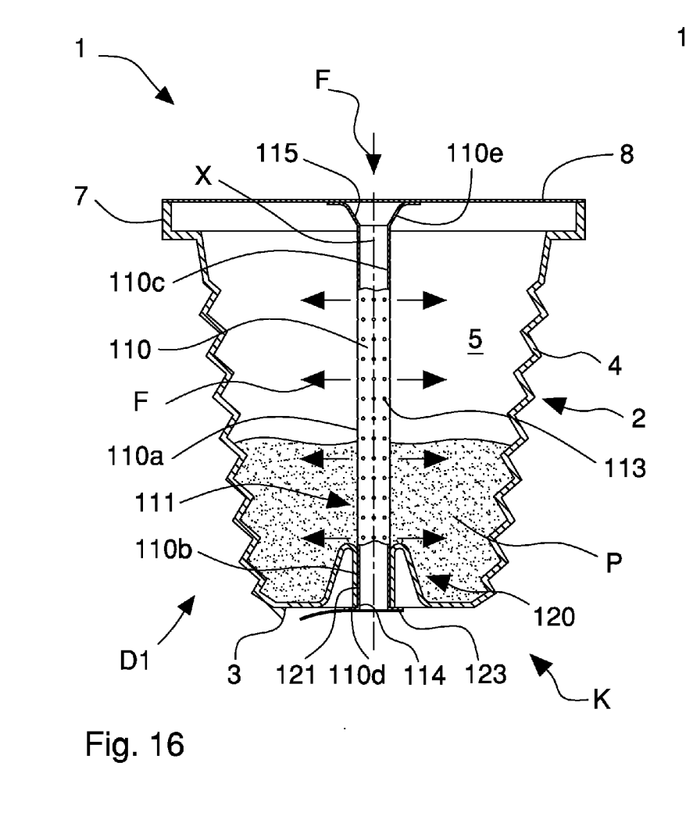
FIG. 16 is a schematic cross section of a further version of the capsule of the invention in a first operating step.
Figure 17:
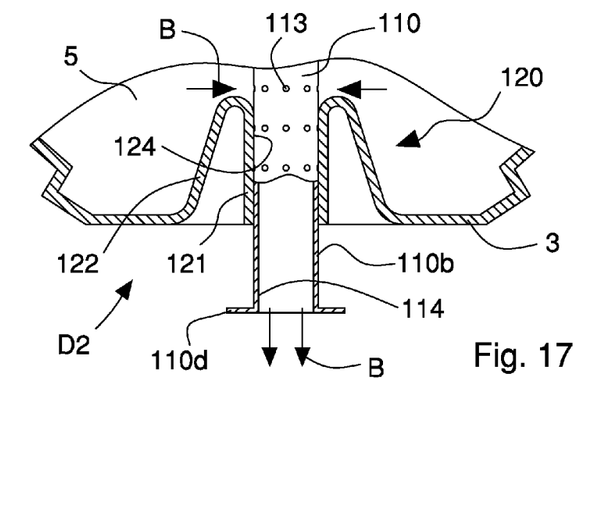
FIG. 17 is an enlarged partial section of the capsule in FIG. 16 in a second operating step.

With reference to FIGS. 16 and 17, another version of the capsule 1 of the invention is illustrated that is distinguished from the previously disclosed embodiments by the fact that it is devoid of the supporting element of the nozzle fixed to an edge 7 of the casing 2. In this case the nozzle 110 is engaged in a sealed manner and supported—substantially maintained in an erect position—by the outflow portion 120 of the base wall 3. The outflow portion 120 is open and has a respective outlet hole 124 that is nevertheless closed in a sealed manner by the nozzle 110. The outflow portion 120 comprises an annular wall 121 that forms the outlet hole 124 and is intended to engage in a sealed manner and support a respective side wall 110a of the nozzle 110, at a first portion 111 of the latter. The cross sections of the nozzle 110, at the first portion 111, and of the annular wall 121 have a complementary shape. In order to ensure the seal, the nozzle 110 is inserted into and slides with interference inside the annular wall 121. The length of the latter in the direction parallel to the longitudinal axis X is such as to support appropriately and maintain in a substantially erect position the nozzle 110, which does not therefore need to be fixed to a supporting element.

The outflow portion 120 further comprises a connecting wall 122 that connects the annular wall 121 to the base wall 3.

The nozzle 110 comprises a first portion 111 provided with openings 113 spaced angularly apart from one another around and linearly along the side wall 110a in such a manner as to enable a plurality of fluid jets F to be dispensed inside the cavity 5. The nozzle 110 comprises an end 110b having a substantially flared shape. More precisely, the end 110b has a further opening 114 for dispensing the fluid F the section of which is equal to the internal cross section of the nozzle and a respective edge or external flange 110d that peripherally surrounds the further opening 114.

The nozzle 110 includes a further end 110e opposite the end 110b and is provided with a further access opening 115 giving access to an internal conduit 110c of the nozzle 110. The further end 110e is arranged for engaging with an injecting device of a dispensing machine that is suitable for dispensing said fluid F.

The capsule 1 is provided with a cover element 8 fixed to the edge 7 of the casing 2 to hermetically close the cavity 5 and is perforable by an injecting device of a dispensing machine. The cover element 8 can be further fixed to the further end 110e to further support the nozzle 110.

In an initial configuration K of the capsule 1 and during the first operating step D1, when the casing 2 is in the original shape i.e. is not compressed or crushed, the end 110b of the nozzle 110 is inserted into the outlet hole 124 and engages the outflow portion 120 in a sealed manner. In particular, the side wall 110a abuts in a sealed manner on the annular wall 121, whereas the external flange 110d abuts on an external surface of the base wall 3. A further closing element 123 is provided to close hermetically the further opening 114 of the nozzle 110 and preserve and insulate from the external environment the product P contained in the capsule. The further closing element 123 further prevents the fluid F and/or the beverage B of the capsule 1 from exiting during the first operating step D1 when the fluid F is delivered into the cavity 5 through the openings 113 of the nozzle 110 (FIG. 16).

The further closing element 123 is removably fixed to the external flange 110d of the nozzle and/or to an external surface of the base wall 3 and can be easily detached by a user before the capsule 1 is introduced into the dispensing machine or by the nozzle 110 in the second operating step D2.

In the second operating step D2, similarly to what occurs for the capsules disclosed previously, at the end of dispensing of the fluid F into the cavity 5 (and of a possible period of infusion of the product P), the casing 2 is compressed and crushed along the direction A so as to enable the nozzle 110 to exit from the cavity 5 (possibly detaching the further closing element 123) to dispense through the further opening 114 the beverage B into the consumption container.

In the second operating step D2, the openings 113 situated inside the cavity 5 receive the final product B, whereas the openings 113 located outside the cavity 5 dispense the final product B and/or the fluid F into the consumption container.

If the casing 2 is partially compressed and crushed in such a manner as to enable the nozzle 110 to exit from the outflow portion 120, one vent hole can be made on the cover element 8 to enable the air to exit from the cavity 5. In this manner, the final product B can exit by gravity through the further opening 114. In this case, dispensing does not require the casing to be crushed completely.

Figure 18:
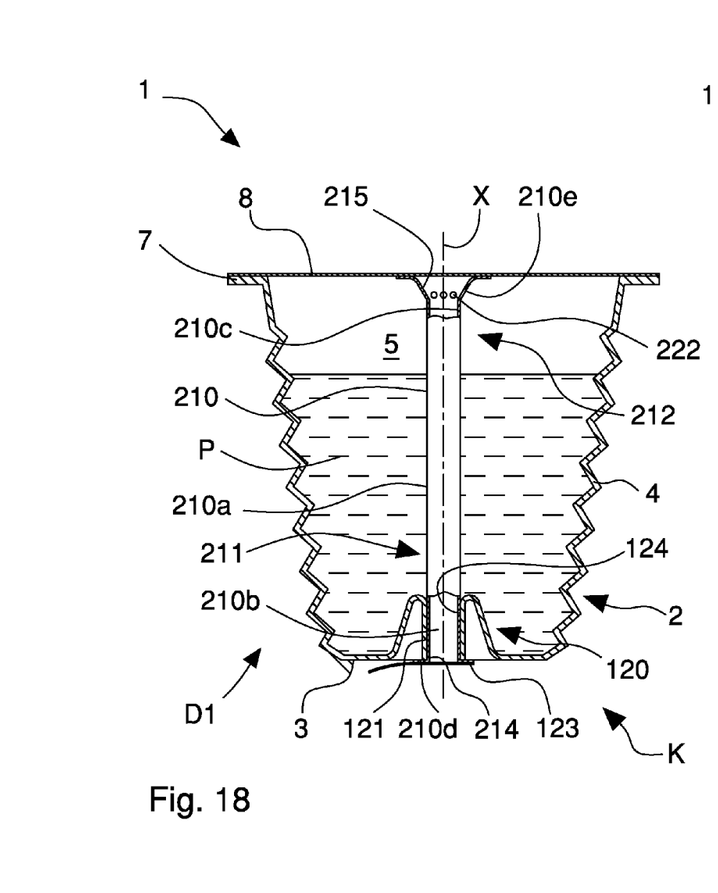
FIG. 18 is a schematic cross section of another version of the capsule of the invention in a first operating step.
Figure 19:
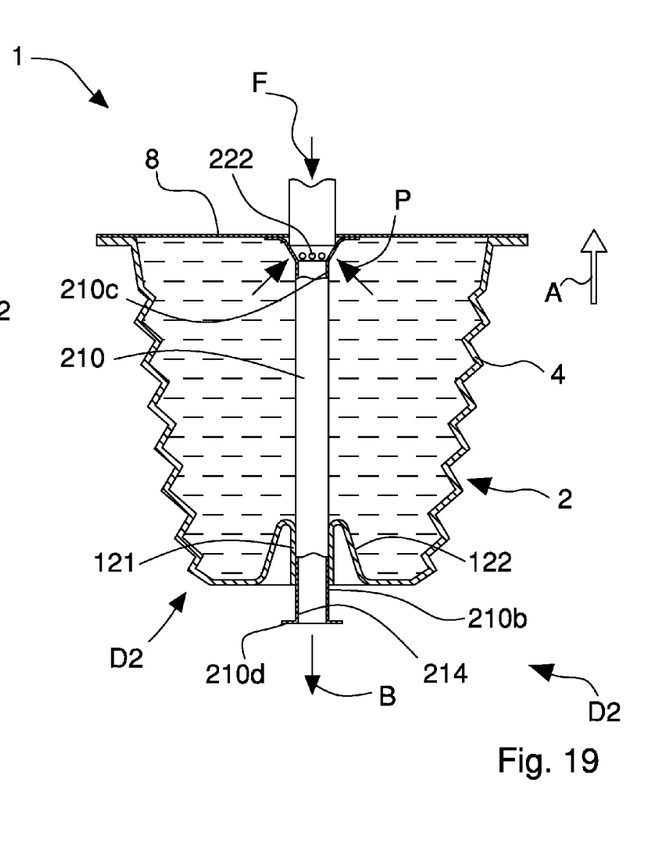
FIG. 19 is a schematic cross section of the capsule in FIG. 18 in a second operating step.

With reference to FIGS. 18 and 19, there is illustrated another version of the capsule 1 of the invention that is distinguished from the embodiment disclosed above and illustrated in FIGS. 16 and 17 by the nozzle 210 that comprises a first portion 211 devoid of openings and a second portion 212 provided with a plurality of further openings 222. The second portion 212, adjacent to the first portion 211 has a shape that substantially diverges from the first portion 211, in such a manner as to be locked in the outflow portion 120 without exiting from the cavity 5 when the casing 2 is compressed and crushed.

The nozzle 210 is engaged in a sealed manner and supported in an erect position by the outflow portion 120 of the base wall 3. The outflow portion 120 is open and has a respective outlet hole 124 that is closed in a sealed manner by the nozzle 210. The outflow portion 120 comprises an annular wall 121 that forms the outlet hole 124 and is intended to engage in a sealed manner and support a respective side wall 210a of the nozzle 210, at the first portion 211 of the latter. The length of the annular wall 121 in the direction parallel to the longitudinal axis X is such as to support appropriately and maintain in a substantially erect position the nozzle 210, which does not therefore need to be fixed to a supporting element.

The outflow portion 120 further comprises a connecting wall 122 that connects the annular wall 121 to the base wall 3.

The nozzle 210 also in this embodiment comprises an end 210b that has a substantially flared shape and is provided with a further opening 214 for dispensing the fluid F having a section that is equal to the internal cross section of the nozzle and a respective edge or external flange 210d that surrounds the further opening 214.

The nozzle 110 includes a further end 210e opposite the end 110b, i.e. at the second portion 212 and is provided with a further access opening 215 providing access to an internal conduit 210c of the nozzle 210. The further end 210e is arranged for engaging with an injecting device of a dispensing machine that is suitable for dispensing the fluid F.

A cover element 8 is fixed to the edge 7 of the casing 2 to hermetically close the cavity 5 and is perforable by an injecting device of a dispensing machine. The cover element 8 can be further fixed to the further end 210e to further support the nozzle 210.

In an initial configuration K of the capsule 1 the casing 2 is in the original shape, i.e. is not compressed or crushed, and the end 210b of the nozzle 210 is inserted into the outlet hole 124 and engages in a sealed manner the outflow portion 120. In particular, the side wall 210a abuts in a sealed manner on the annular wall 121, whereas the external flange 210d abuts on an external surface of the base wall 3.

A further closing element 123 is provided to close hermetically the further opening 214 of the nozzle 210 so as to preserve and insulate from the external environment the product P contained in the capsule and prevent the initial product P from exiting.

The further closing element 123 is removably fixed to an external flange 210d of the nozzle and/or to an external surface of the base wall 3 and can be easily detached by a user before the capsule 1 is introduced into the dispensing machine or by the nozzle 210.

This capsule is suitable for liquid initial products, for example concentrated solutions to be diluted during dispensing.

Using this version of the capsule 1, in the first operating step D1 the injecting device of the dispensing machine pierces the cover element 8 to engage the further end 210e of the nozzle 210 in a sealed manner without, however, delivering the fluid.

The second operating step D2 is divided into two successive substeps. In a first stage (opening substep) the casing 2 is compressed and crushed along the direction A, so as to enable the bottom of the capsule 1 to open through detachment of the further closing element 123, a detachment that can occur both owing the increase of pressure inside the capsule and the action of the nozzle 210 that progressively exits from the cavity 5. The air contained inside the cavity 5 can exit by passing from the further openings 222 through the internal conduit 210c of the nozzle 210.

Subsequently (dispensing and dilution substep), the casing 2 is further compressed and crushed along the direction A and the fluid F is delivered by the injecting device in the nozzle 210 so that the initial product P exits from the capsule 1 through the further openings 222 of the nozzle 210 and in the internal conduit 210c it joins and mixes with the fluid F. A final product B that is suitably diluted from a concentrated initial product P (FIG. 19) is then dispensed into the consumption container.

The quantity of initial product P inside the cavity 5 (level) is such as to enable the initial product P to exit from the further openings 222 only when the end 210b of the nozzle 210 is no longer covered by the further cover element 123.

Dispensing of the fluid F can last as long as crushing of the casing 2, or last longer. In this latter case, the final product B will be further diluted inside the consumption container. At the end of crushing of the casing 2 the second portion 212 and the further openings 222 remain inside the capsule 1.

Owing to the capsule of the invention it is thus possible to dilute, or mix or blend in an optimum manner the initial product P, typically a concentrated liquid solution, with the dilution fluid. This dilution/mixing, which occurs directly inside of the nozzle 210, enables a final product that is already ready to be dispensed into the consumption container.

Figure 20:
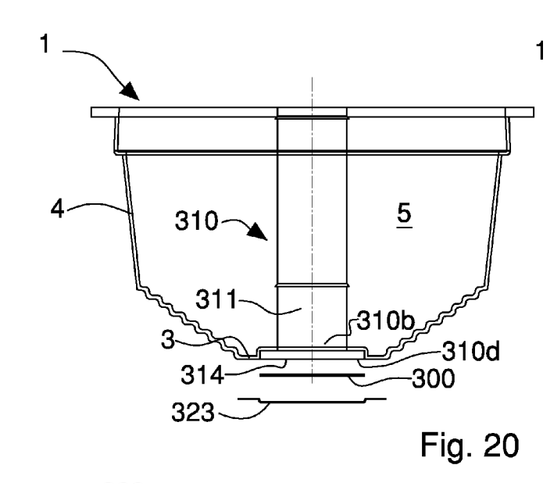
FIG. 20 is a schematic exploded cross section of another version of the capsule of the invention.
Figure 21:
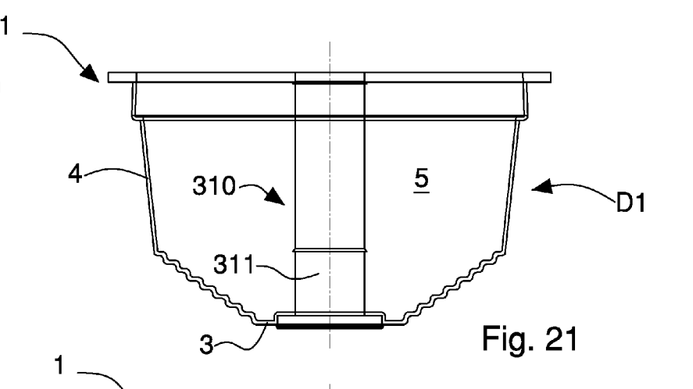
FIG. 21 is a schematic cross section of the capsule in FIG. 20 in a first operating step.
Figure 22:
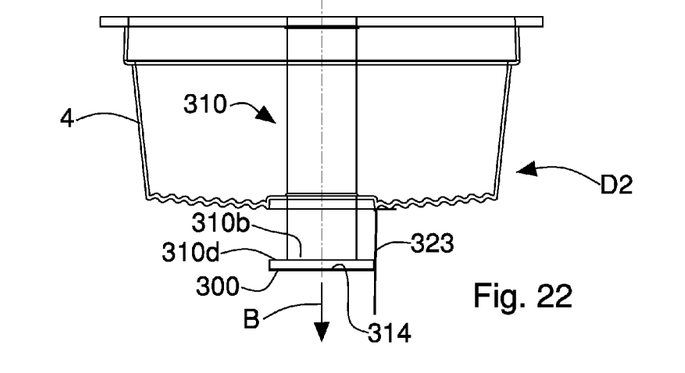
FIG. 22 is a cross section of the capsule in FIG. 20 in a second operating dispensing step.

With reference to FIGS. 20, 21 and 22, there is illustrated another version of the capsule 1 of the invention that is distinguished from the previously disclosed embodiments by the fact that it comprises a filtering element 300 fixed to the nozzle 310. The latter, also in this embodiment comprises a first portion 311 that ends with an end 310b provided with a further opening 314 for dispensing the fluid F or the final product B that has a section that is equal to the internal cross section of the nozzle and a respective edge or external flange 310d that surrounds the further opening 314. As in the embodiments of the capsule disclosed previously, also in this version the nozzle 310 comprises openings (not shown) through which the fluid F is introduced inside the cavity 5 of the capsule 1 to interact with the initial product P in such a manner as gradually to form the final product B. These openings substantially act as filters, because they retain and lock inside the cavity 5 non soluble particles and bodies (for example tea leaves or coffee grounds) of the initial product P, whereas they enable the thus obtained final product B to exit freely.

Figure 20A:
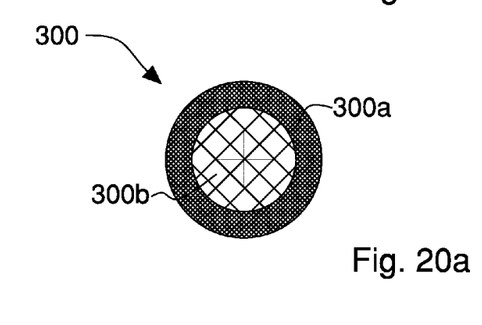
FIG. 20a is an enlarged plan view of a filtering element comprised in the capsule in FIG. 20.

As more clearly visible in the view in FIG. 20a, the filtering element 300 comprises an external edge 300a thermowelded to the external flange 310d and a filtering zone 300b facing the further opening 314 and arranged for being traversed by the fluid F or by the final product B.

Alternatively, the external edge 300a can be glued to the external flange 310d by a suitable adhesive of known type.

The fluid F or the product B exiting from the opening 314 traverse the filtering zone 300b before reaching the consumption container. The filtering zone 300b thus enables possible micro-powders and micro-residues of the initial product P to be retained inside the cavity 5 in such a manner as to prevent the drop thereof inside the consumption container.

Also in this embodiment the capsule 1 comprises a further closing element 323 to close hermetically the further opening 314 of the nozzle 110 and preserve and insulate from the external environment the product P contained in the capsule. The further closing element 323 further prevents the fluid F and/or of the beverage B from exiting from the capsule 1 during the first operating step D1 (FIG. 21). The further closing element 323 is arranged in such a manner as to cover, and protect, the filtering element 300, as seen better from the exploded view in FIG. 20.

The further closing element 323 is removably fixed to an external surface of the base wall 3 and can be easily detached from the nozzle 310 in the second operating step D2 (FIG. 22).

The invention claimed is:

1. A capsule, comprising a deformable casing including a base wall and a side wall defining a cavity which contains an initial product to be combined with a fluid to obtain a final product, wherein said side wall is deformable along preset compliance lines to enable said casing to be compressed along a direction that is orthogonal to the base wall, and wherein the capsule includes a nozzle including a plurality of openings for passage of said fluid, said nozzle being engaged with an outflow portion of said base wall and extending from said cavity through said outflow portion when said casing is compressed, said nozzle including a first portion abutting on and sliding with interference inside said outflow portion in a sealed manner, said final product at least initially exiting said cavity only through at least one further opening of said nozzle,
wherein said nozzle comprises a stiff tubular element having a side wall containing said plurality of openings and a first end engaged in said outflow portion in an initial configuration in which said casing is not compressed,
wherein said first end includes
a) said at least one further opening arranged for dispensing at least one of said fluid and said final product directly into a consumption container; and
b) an external flange that peripherally surrounds said at least one further opening,
wherein said capsule comprises a closing element removably connected with an external surface of said base wall to hermetically close at least said at least one further opening;
said closing element adapted to be detached by said nozzle external flange when said casing is compressed.

2. A capsule according to claim 1, wherein said nozzle comprises a second end opposite said first end, said second end containing a further opening and engaging an injecting device of a dispensing machine for dispensing said fluid.

3. A capsule according to claim 1, wherein said plurality of openings are distributed along said nozzle in such a manner that in a first operating step, wherein said casing is not compressed, said plurality of openings dispense said fluid into said cavity and in a second operating step when said casing is compressed and said nozzle partially extends from said cavity, said plurality of openings situated inside said cavity receive at least one of the final product and a mixture of said initial product and said fluid, whereby said plurality of openings situated outside said cavity dispense at least one of said final product and said fluid in a consumption container.

4. A capsule according to claim 1, wherein said outflow portion comprises an annular wall abutting on a respective side wall of said nozzle at said first portion in a sealed manner.

5. A capsule according to claim 4, wherein said outflow portion comprises an outlet hole hermetically closed by said nozzle.

6. A capsule according to claim 4, wherein said annular wall supports said nozzle in an erect position.

7. A capsule according to claim 1, wherein said nozzle comprises a second portion adjacent to said first portion and spaced from said base wall, said second portion having a cross section that enables said final product to exit from said cavity through a passage defined by said outflow portion and said second portion when said casing is compressed to bring said second portion to said outflow portion.

8. A capsule according to claim 1, and further comprising a cover element connected with an edge of said casing to hermetically close said capsule, said cover element being perforable by an injecting device of a dispensing machine that is suitable for receiving said capsule.

9. A capsule according to claim 8, wherein said nozzle comprises a second end opposite said first end and contains a further opening for engaging an injecting device of a dispensing machine that dispenses said fluid, and wherein said cover element is connected with said second end.

10. A capsule according to claim 1, and further comprising a supporting element connected with a first edge of said casing and facing said cavity, said nozzle being connected with said supporting element.

11. A capsule according to claim 1, and further comprising a filtering element connected with said nozzle.

12. A capsule according to claim 11, wherein said filtering element comprises an external edge, welded to said external flange of said nozzle, and a filtering zone facing said at least one further opening and being traversed by at least one of said fluid and said final product.

* * * * *